March 23, 1965  H. MALSERT  3,174,240
INDEX TABS
Filed Sept. 25, 1962
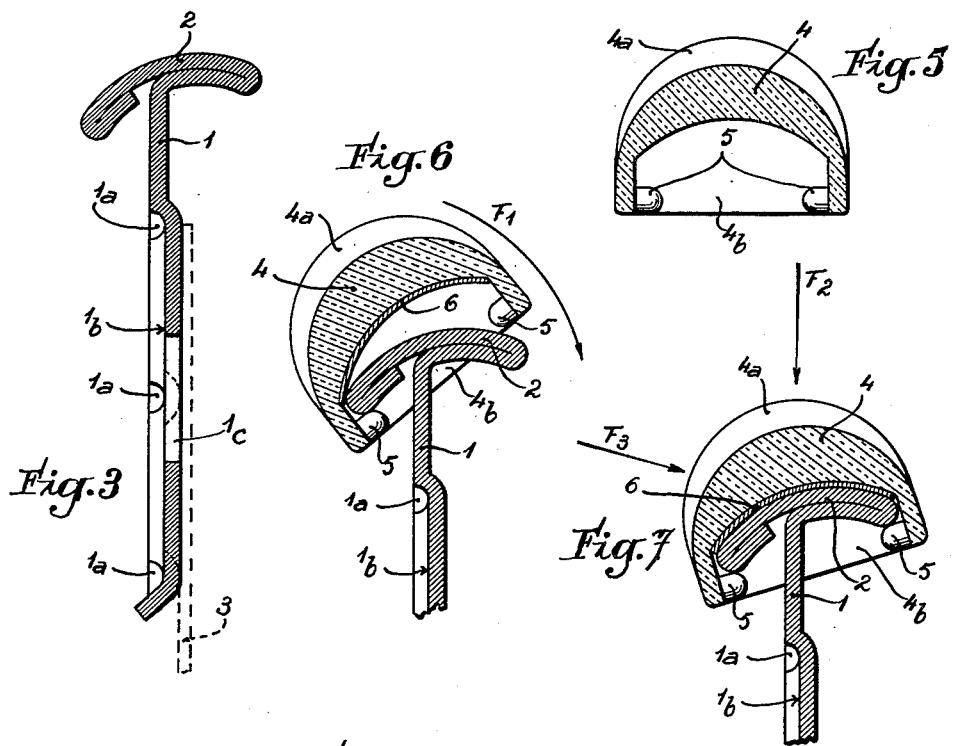
INVENTOR
Henri Malsert
BY Alexander M Lowell
ATTORNEYS

United States Patent Office 3,174,240
Patented Mar. 23, 1965

3,174,240
INDEX TABS
Henri Malsert, 47 Rue Cuvier, Lyon, Rhone, France
Filed Sept. 25, 1962, Ser. No. 226,016
Claims priority, application France, May 17, 1962, 42,596
1 Claim. (Cl. 40—23)

The present invention relates to index tabs disposed on the visible edge of filing folders and the like, as for instance on the front edge thereof in the case of a suspension filing system of the lateral type.

Such index tabs are commonly in the form of a sheet-iron member secured, as for instance by riveting, to the desired edge of the folder, card or the like, the said member being T-shaped in cross-section so as to comprise an elongated flat portion or index supporting table adapted to receive an indexing strip of paper protected and retained by a transparent sheath. In the known constructions the transparent sheath is made of a strip of transparent sheet material having its lateral edges turned inwardly and slidably disposed on the index supporting table, the latter having preferably an end lug forming a stop for the sheath.

This known arrangement suffers from a number of disadvantages. The indexing paper strip and the transparent protective sheath are only retained on the supporting table in one direction by the end lug or stop and they may therefore become inadvertently displaced thereon by an operator. More particularly the paper strip may become partly disengaged from its protective sheath. The inner side of the transparent sheath itself is generally not uniformly applied on the supporting table and the indexing strip is not therefore perfectly maintained in the flat condition against the said table. It is to be remarked in this respect that if the transparent sheath is so arranged as to fit accurately against the supporting table, it becomes quite difficult to dispose the indexing strip between the sheath and the table. But even if a reasonable clearance is provided betwen the transparent sheath and the supporting table, the indexing paper strip is not readily inserted between these members.

A first object of the present invention is to provide an index tab wherein the indexing paper strip will be positively retained longitudinally with respect to the transparent protective sheath, without any possibility of becoming disengaged therefrom.

Another object of this invention is to provide an index tab wherein the transparent protective sheath will be retained in both directions on the supporting table and will not be inadvertently displaced when handling the folders, pockets, cards or the like within the filing cabinet.

A further object of this invention is to provide an index tab wherein the transparent protective sheath will maintain the indexing paper strip firmly and uniformly applied against the supporting table.

Still a further object of this invention is to provide an index tab wherein the insertion of the indexing paper strip will be easily effected.

In accordance with the present invention the transparent protective sheath, made of a resilient material, is of U-shaped cross-section so that it is possible to directly engage the said sheath on the supporting table without any sliding displacement, and the inner sides of the branches of the U comprise inwardly directed projections adapted to retain the sheath on the table. It will be appreciated that owing to the resiliency of the sheath, the latter may be forced on the table, the inner projections snapping back under the lateral edges of the latter. In order to facilitate this operation, the said lateral edges of the supporting table and the inner projections of the transparent protective sheath are preferably rounded.

According to another aspect of the present invention the transparent protective sheath is of greater length than the supporting table and it is formed at each end with an inwardly protruding portion adapted to form an abutment or stop for one end of the supporting table. Owing to this arrangement the transparent protective sheath is longitudinally retained in both directions on the supporting table. Further, if the indexing paper strip is properly cut, it is itself longitudinally retained within the sheath between the said protruding portions without any possibility of becoming disengaged either laterally or longitudinally.

The transparent protective sheath is preferably formed as a cylindrical lens in order to facilitate the reading of the mentions written on the indexing strip. It is to be noted in this respect that owing to the fact that the inner side of the sheath applies intimately and evenly against the said strip, the operation of this cylindrical lens is quite satisfactory, which would not be the case if, due to a relatively wide intermediate space or clearance between the sheath and the supporting table, the said strip were free to cockle.

In the preferred embodiment, the supporting table is of convex arcuate cross-section and the transparent protective sheath comprises in cross-section a concave arcuate inner side adapted to fit against the outer side of the table (neglecting the quite small thickness of the intermediate indexing paper strip), and a convex arcuate outer side having a smaller radius of curvature than the inner side.

The ends of the transparent protective sheath are preferably re-inforced.

In the annexed drawing:

FIG. 1 is a side view of an index tab according to the present invention, the transparent protective sheath and the indexing paper strip being supposedly removed.

FIG. 2 is a side view similar to FIG. 1, but showing the transparent protective sheath mounted in position.

FIG. 3 is an enlarged cross-section taken along line III—III of FIG. 1.

FIG. 4 is an enlarged fragmental longitudinal section of the transparent protective sheath.

FIG. 5 is a cross-section of the protective sheath taken along line V—V of FIG. 4.

FIG. 6 is a cross-section illustrating the first step in the mounting of the protective sheath on the supporting table of the index tab.

FIG. 7 is a cross-sectional view similar to FIG. 6, but showing the sheath fully mounted on the supporting table with the index strip disposed therebetween.

In the example illustrated the index tab comprises an elongated sheet-iron member 1 (FIGS. 1 and 3) formed with longitudinal re-inforcing ribs 1a leaving spaced flat portions 1b which are perforated, as at 1c, to receive the eyelets, rivets or the like by means of which member 1 may be secured for instance to the marginal portion of the cover 3 of a folder. Member 1 extends laterally beyond the zone thereof comprising the longitudinal ribs 1a and it is twice folded longitudinally on itself at 180° so as to determine a T-shaped profile, as closely shown in FIG. 3, the upper or transverse branch 2 of the T being slightly arcuate, with its convexity facing generally upwardly and being further slightly oblique with respect to the general plane of member 1, in this sense that the central zone of the curved outer side of the said branch faces somewhat laterally with respect to member 1. It is further to be noted that owing to the double folding at 180°, the edges of the transverse branch 2 are rounded and that their thickness is substantially twice the thickness of the sheet material from which member 2 is made. It will be readily appreciated that this transverse branch of the T forms an elongated convex table extending along the full length of member 1, as clearly shown in FIG. 1.

The supporting table 2 is adapted to receive a protective sheath 4 (FIGS. 4 and 5) made of resilient transparent material, such as a plastic. This sheath is of generally inverted U-shaped cross-section, the distance apart of the branches of the U being equal to or very slightly greater than the width of the supporting table 2. The inner side of the intermediate or central branch of the U is arcuate with the concavity facing outwardly, and its curvature is substantially the same as that of the outer side of the supporting table 2. The outer side of the said central branch is also arcuate, its convexity facing outwardly, and its radius of curvature is substantialy smaller than the radius of curvature of the inner side, whereby this central portion of the sheath forms a cylindrical magnifying lens element. Sheath 4 is slightly longer than table 2 and its ends are thickened, as shown at 4a. In the vicinity of each thickened end 4a sheath 4 is formed with an inner transverse partition 4b, the distance apart of these partitions being equal to or slightly greater than the length of table 2. Further each inner lateral wall of the sheath (i.e. the inner side of each lateral branches of the U) comprises a longitudinal row of small inwardly directed projections 5 provided with rounded ends, these projections being elongated longitudinallly of sheath 4, as clearly shown in FIG. 4.

The sheet-iron member 1 being secured to the desired edge of the folder or the like, the indexing paper strip 6 (FIGS. 6 and 7) is disposed within the transparent protective sheath 4, the length and the width of this strip being of course equal respectively to the length and width of the supporting table 2. It will be appreciated that once the strip is fully applied against the concave inner side of the sheath, it is retained therein laterally and axially under the effect of its own resiliency, i.e. its tendency to return to the flat condition. Next, sheath 4 is engaged laterally on table 2, as shown in FIG. 6, in such a manner that one of the edges of the table (left-hand edge in FIG. 6) be engaged between projections 5 and the bottom or inner concave side of the sheath, while the other edge (right-hand edge in FIG. 6) of the table abuts against the corresponding projections 5. Sheath 4 is then pressed against the right-hand edge of table 2, or in other words it is turned clockwise as indicated by arrow $F_1$. Owing to the inherent resiliency of the sheath, the U-shaped cross-section expands sufficiently to permit projections 5 to slide over the rounded edge of table 2 and to snap back under the said edge, as shown in FIG. 7.

It will be observed that at the position of FIG. 7 the inner projections 7 are in contact with the lower side of the rounded edges of table 2. The inner side of the transparent protective sheath 4 is therefore firmly applied against the outer side of the supporting table 2, the thin indexing strip 6 being evenly pressed between the table and the sheath and being thus fully prevented from cockling. Further this paper strip is retained longitudinally in both directions by partititons 4b and the latter also prevent the sheath from sliding longitudinally on the supporting table whatever may be the position of the said table. The insertion of the paper strip is quite easy. Owing to the fact that the indexing strip is perfectly applied against the supporting table, the magnifying effect of the transparent sheath is quite regular, and if the curvature and other optical factors have been properly selected, the whole of the indexing strip will be clearly seen without any difficulty.

Owing to the obliquity of the supporting table 2, the indexing strip may be seen from the front of the filing cabinet (arrow $F_2$ in FIG. 7) and also from the side thereof (arrow $F_3$).

While the table carrying member 1 has been described as made from sheet material (i.e. in practice from sheet metal), it will be appreciated that same could be made with the supporting table as a single part from an appropriate molded plastic.

The indexing tab according to the invention may of course be applied to any kind of filing element such as folders, pockets or the like for any suspension filing system, cards, portfolios, etc.

I claim:

An index tab adapted to be secured to a filing folder, card or like article and to removably retain on such article an indexing strip, comprising an elongated supporting table with straight lateral edges, said table having an upper side of convex cross-section with a first radius of curvature, and a lower side; and a removable transparent resilient sheath having an inner side of concave cross-section with a second radius of curvature substantially equal to said first radius of curvature, and an outer side of convex cross-section with a third radius of curvature substantially smaller than said second radius of curvature, said inner side of said sheath being applied against said indexing strip disposed on said upper side of said supporting table, said sheath being further formed with substantially continuous parallel lateral walls which extend from said inner side of said sheath to form therewith a U shaped cross-section, said lateral walls extending along each straight lateral edge of said supporting table and having spaced inner rounded projections which resiliently engage said lower side of said supporting table, but which may be moved apart against the resiliency of said sheath to remove same from said supporting table and also to mount said sheath on said table, and said sheath being of greater length than said table and having at its ends inner portions which form abutments for the ends of said supporting table to substantially prevent longitudinal displacement of said sheath thereon.

References Cited by the Examiner

UNITED STATES PATENTS

| 358,080 | 2/87 | Smith | 40—315 |
|---|---|---|---|
| 1,128,044 | 2/15 | Rand | 40—17 X |
| 2,151,573 | 3/39 | Stanley | 88—39 |
| 2,533,628 | 12/50 | Rosenberg | 88—39 X |

FOREIGN PATENTS

| 61,650 | 12/54 | France. |
|---|---|---|
| 912,008 | 4/45 | France. |
| 431,236 | 7/35 | Great Britain. |

JEROME SCHNALL, *Primary Examiner.*

E. V. BENHAM, *Examiner.*